Nov. 1, 1938.  A. SOMMERMEYER  2,135,203
DEVICE FOR THE CONTINUOUS TREATMENT OF ANIMAL
CARCASSES, SLAUGHTERHOUSE OFFAL, ETC
Filed Oct. 1, 1936  2 Sheets-Sheet 1
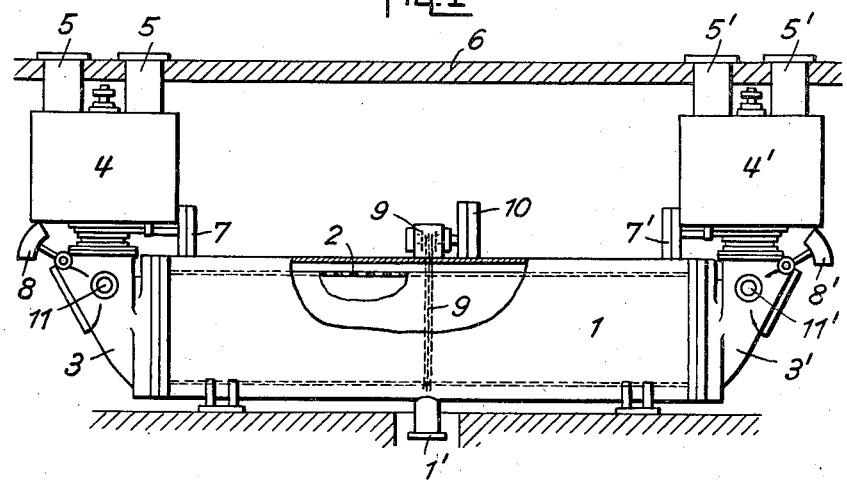
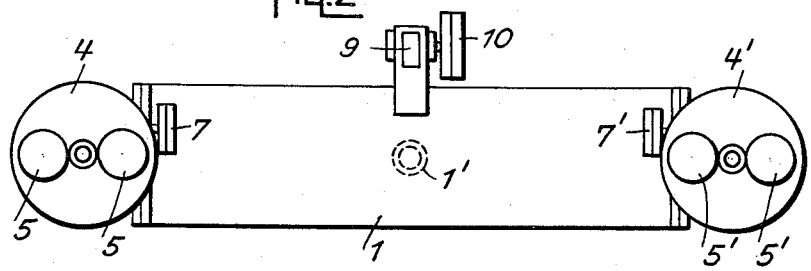
August Sommermeyer
INVENTOR
His Atty

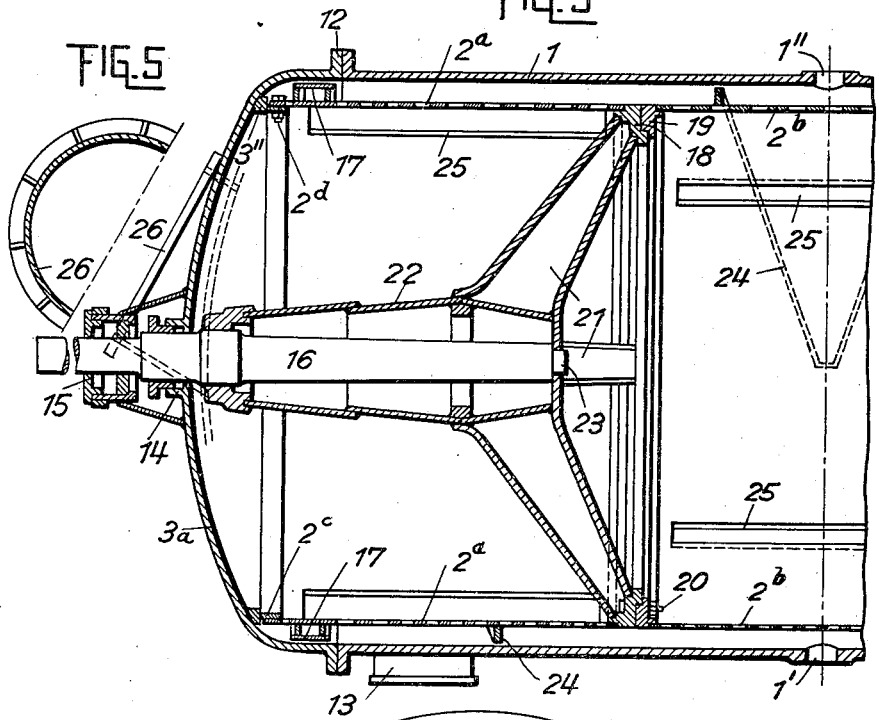
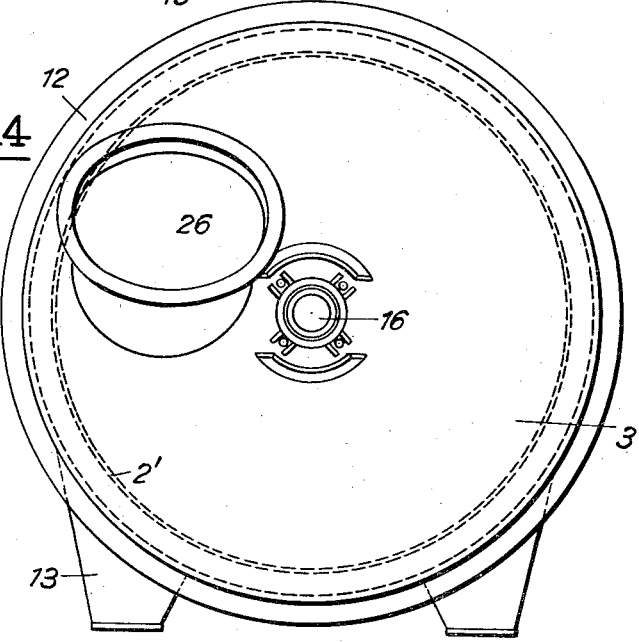

Patented Nov. 1, 1938

2,135,203

UNITED STATES PATENT OFFICE 2,135,203

DEVICE FOR THE CONTINUOUS TREATMENT OF ANIMAL CARCASSES, SLAUGHTER-HOUSE OFFAL, ETC.

August Sommermeyer, Berlin-Rudow, Germany

Application October 1, 1936, Serial No. 103,624
In Germany October 11, 1935

7 Claims. (Cl. 87—13)

The well-known horizontal cylindrical disintegrating apparatus for continuously treating the carcasses of land and sea animals, slaughter house offal, etc. with a continual delivery of the liquid and solid products have, hitherto, been charged with fresh material, at certain intervals, from one end for instance by a conveyor worm or a funnel or the like, or by a so-called sluice, viz. a receiver which is at times shut off from the disintegrating apparatus and receives the material which is then warmed up whereupon the sluice opens automatically and delivers the material to the disintegrating apparatus.

With the outputs per hour, heretofore attained, the efficiency of the unilateral charging method was satisfactory but, now the tendency exists to substantially increase the output per hour so that the amounts of fresh material to be introduced into the disintegrating apparatus become very large. A very large quantity of material being charged from time to time, a sudden substantial drop of pressure will take place in the disintegrating chamber and will extend into the receptacle intended for receiving the solid and liquid products of disintegration. This interferes with the decantation of the products, particularly of the fat, in the receptacle; the discharging of the fat will be more difficult and even at times impossible, further the quality of the fat is impaired.

According to the invention, these drawbacks will be eliminated thereby that the material to be fed intermittently to the disintegrating chamber is introduced partly at one end and partly at the other end (e. g. approximately half and half) of the disintegrating chamber. Preferably one portion each is fed to the disintegrating chamber alternatingly at one end and at the other end of the latter.

The division of the material in two portions affords the advantage that the variations of the pressure prevailing in the disintegrating chamber are very small and will no longer exert objectionable influences, and in the whole disintegrating chamber there is essentially the same temperature so that the process will be accelerated.

In the known digesting apparatus with feeding device, the latter consists of a single container arranged at one end of the digesting cylinder and having an upper feeding opening and a lower opening which latter leads directly into the digesting cylinder. Flap doors are provided for each of said openings, respectively, the lower door being constructed to open automatically when the material in the feeding container has been preheated. The upper door can be opened only when the lower door has been closed and the container has been connected with the outer atmosphere. After opening the upper door, the raw material is fed into the feeding container. Then the upper opening is closed and the connection of the container with the atmosphere is shut off, whereupon steam is led into the container for gradually preheating the material. When the pressure in the heating chamber has risen to the height of that in the digesting cylinder, a pressure equilibrium is obtained and it is then only the weight of the material in the feeding container which acts upon the lower flap door. Consequently, this door opens and the material slides into the digesting drum.

According to the present invention, instead of one large feeding container at one end of the digesting cylinder two smaller feeding containers are arranged at the two ends of the digesting cylinder, respectively. In the known devices the entire hourly charge is introduced in one operation at one end of the cylinder, while according to the present invention only half the hourly charge is fed every half hour alternately into the containers at the two ends of the device. The smaller quantities are preheated throughout in a relatively short time, whereby in the disintegrating cylinder no cold surfaces are exposed to the steam, when large pieces of material break up, and the raw material fed to the digesting cylinder at one end thereof has plenty of time to disintegrate and move away from the charging opening towards the middle of the cylinder, because the succeeding charge is fed to the opposite end of the cylinder. Thus, any undesirable drop of pressure in the digesting cylinder and any danger of choking of the device are successfully avoided. The output which can be obtained in a device according to the present invention is substantially higher than that of the devices known heretofore.

An example of execution of a device intended for carrying out the new method is illustrated in the drawings showing in:

Fig. 1 an elevation of a disintegrating apparatus for the wet rendering of the material with an intermittent charging, Fig. 2 a top plan view of the device shown in Fig. 1, Fig. 3 a vertical section through a part of the apparatus according to Fig. 1 but, of a design somewhat modified, Fig. 4 an end view of the device shown in Fig. 3, Fig. 5 a detail thereof.

The horizontal cylindrical disintegrating apparatus 1 contains a sieve drum 2 which, at its open ends, opens into the two heads 3, 3' of the cylinder 1 and is charged at a time through one of the filling sluices 4, 4'. The latter are e. g. provided each with two feed hoppers 5, 5 and 5', 5' susceptible of being closed steamtight and built into the floor 6 of the feeding room so as to be tight against any percolation of liquids. In order that the sluices 4, 4' can be completely emptied they contain each an agitator driven by pulleys 7, 7'. The heads 3, 3' made for instance of cast steel connect the sluices 4, 4' with the sieve drum 2 and contain in their interior each a flap with a weight 8, 8' for shutting the sluices 4, 4' from below.

The sieve drum is being continuously rotated at a low speed e. g. by a chain drive 9 through pulleys 10 or the like. The passage of the material from the sluices 4, 4' into the sieve drum 2 can be observed through inspection glasses 11, 11' mounted on the heads 3, 3'. A discharge connection 1' disposed in the center of the cylinder 1 at its lowest point delivers the liquid and solid products of disintegration, continuously leaving the sieve drum 2, into an otherwise closed receptacle (not shown), which is subject to the pressure prevailing in the cylinder 1.

The operation of the device shown is for instance as follows:

The sluice 4 is charged while the feed hopper 5 is open, the flap loaded by the weight 8 closing the sluice from below with the aid of the steam pressure prevailing in the cylinder 1. After charging, the hopper 5 is closed and boiler steam is fed to the receiver 4. The same warms up the fresh material and its pressure rises until it has arrived at the steam pressure prevailing in the disintegrating apparatus 1. Now the flap (8) will automatically be opened by the load of the material resting upon it and the contents of the receiver 4 will, through the head 3, slide into the sieve drum 3. While this is done, in view of the very reduced quantity of material being supplied, only a slight drop of pressure will arise which is equalized much more quickly than the second sluice 4' can be opened, charged and warmed up. The treatment of the material thus takes place without any trouble and with small unobjectionable variations of pressure only.

The example of execution according to Figs. 3 to 5 shows a part of a disintegrating apparatus in which the heads 3 of the cylinder 1 are not made of cast steel but are pressed boiler heads which are connected by flanges 12 to the cylinder 1 supported by feet 13. Each head 3 carries a stuffing box 14 and a bearing 15 for a trunnion shaft 16. In the center of the apparatus there is disposed below the emptying aperture 1' for the solid and liquid products and on top the inlet opening 1" for the boiler steam intended to disintegrate the material. The second half of the apparatus identical with that shown is to the right of the vertical middle axis.

The sieve drum receiving the material has completely open ends extending all the way to the shell ends 3, 3'. The sieve drum comprises three longitudinal sections, the first of which 2a is shown completely and the second 2b approximately to one half thereof, while the third section is disposed in the apparatus portion not shown. Each end section carries a ring 2c bolted thereto which ring bears against a wide annular rib 3a of either head 3. After the sieve drum has been built-in, the ring 2c is pushed tightly against the rib 3a and then firmly clamped by means of the bolts 2d so as to secure a tight connection. The free end of either outside section is stiffened by a ring 17 designed as a box type girder. The adjacent sections carry flanges 18 and 19 which are connected by bolts 20. To the flange ring 18 is attached a spider 21 with e. g. four slanting box type hollow arms the inner ends of which are fastened, for instance, to a long hollow hub 22. The same encircles the trunnion shaft 16 which engages the said hollow hub 22 with an extension 23. The spider 21 can also be mounted directly at the shaft 16.

A conveyor worm 24 secured to the outside of the sieve drum pushes, in a manner known per se, the material already disintegrated, as soon as it leaves the sieve drum, to the discharge opening 1'. Within the sieve drum the material is taken along and turned by battens 25. Each head 3 excentrically carries a short e. g. inclined connection 26 for mounting the sluices 4, 4' (Figs. 1 and 2) or other suitable filling appliances. The connections 26 may be disposed at any point of the heads 3 within the rib 3a as the spiders 21 are mounted at so large a distance from the heads 3 that the material can freely slide into the interior of the sieve drum.

Having now particularly described and ascertained the nature of my said invention and in what manner the same is to be performed, I declare that what I claim is:

1. In a digesting apparatus of the character described, adapted for continuous operation, a horizontal cylindrical cooking shell having a central outlet, and feeding inlets at both ends thereof, two feeding devices connected to said feeding inlets, respectively, each of said feeding devices comprising a preheating chamber provided with a feeding door and with a door establishing communication with the shell, means for heating the material in the shell, means for preheating the material fed to the preheating chambers so as to raise the pressure thereof to about that prevailing in the cooking shell, and a cylindrical screen mounted for concentric rotation within said shell, said screen having completely open ends extending all the way to the shell ends so that preheated material may be fed directly into said screen through the ends thereof.

2. In a digesting apparatus as set forth in claim 1, shafts extending through the shell ends, and spiders supporting the screen upon said shafts, said spiders being substantially spaced from the open screen ends to permit free ingress and distribution of preheated material.

3. In a digesting apparatus as set forth in claim 1, said screen comprising a medial portion and end sections, flange rings securing the end sections to the medial portion, shafts extending through the shell ends, and spiders supporting the screen upon said shafts, said spiders engaging the screen at said flange rings and being substantially spaced from the open screen ends to permit free ingress and distribution of preheated material.

4. In a digesting apparatus as set forth in claim 1, an annular rib on the interior of each shell end, and a longitudinally adjustable ring on each screen end adapted to be brought into contacting engagement with the corresponding annular rib when the screen is installed in the shell.

5. In a digesting apparatus as set forth in claim 1, said screen comprising a medial portion and end sections secured thereto, and a girder-like ring reinforcing the outermost end of each end section.

6. In a digesting apparatus as set forth in claim 1, shafts extending through the shell ends and projecting into the shell interior, a hollow hub mounted on each shaft and secured at its inner end to said shaft, and spiders secured to the inner ends of said hubs for supporting the screen upon said shafts, said spiders being thus substantially spaced from the open screen ends to permit free ingress and distribution of preheated material.

7. In a digesting apparatus, as claimed in claim 1, a spiral element on the exterior of the cylindrical screen for conveying the disintegrated material from the ends of the cooking shell towards the central outlet.

AUGUST SOMMERMEYER.